United States Patent [19]
Lewis

[11] 3,773,378
[45] Nov. 20, 1973

[54] VEHICLE OVERHEAD CONSOLE

[76] Inventor: Daniel A. Lewis, 5730 N. 23rd Ave., Phoenix, Ariz. 85015

[22] Filed: Aug. 22, 1972

[21] Appl. No.: 282,788

[52] U.S. Cl. ... 296/37 R, 224/42.1 C, 224/42.42 R, 312/246, 312/309
[51] Int. Cl. .............................. B60r 7/04
[58] Field of Search .................. 296/37 R; 224/42.1 R, 42.1 C, 42.1 D, 42.1 E, 42.42 R, 42.46 R; 206/19.5 R, 19.5 B; 312/245, 246, 309

[56] References Cited
UNITED STATES PATENTS

| | | | |
|---|---|---|---|
| 1,964,339 | 6/1934 | Brassell | 296/37 R X |
| 2,236,428 | 3/1941 | Haas | 296/37 R |
| 3,284,041 | 11/1966 | Tjaden | 224/42.1 C X |
| 3,550,001 | 12/1970 | Hanley | 296/1 R X |
| 3,632,158 | 1/1972 | Boothe | 296/37 R |

Primary Examiner—Kenneth H. Betts
Assistant Examiner—Leslie J. Paperner
Attorney—Eric P. Schellin et al.

[57] ABSTRACT

This specification discloses a console that is mounted on the underside of the roof of a vehicle cab midway the sides thereof. The console is of elongate, rectangular shape and provides two compartments, one of these is a forward compartment having an inclined bottom and a rearwardly opening access area. The rear compartment has an access opening on each side which is normally closed by a door that is hingedly mounted on its upper edge.

8 Claims, 7 Drawing Figures

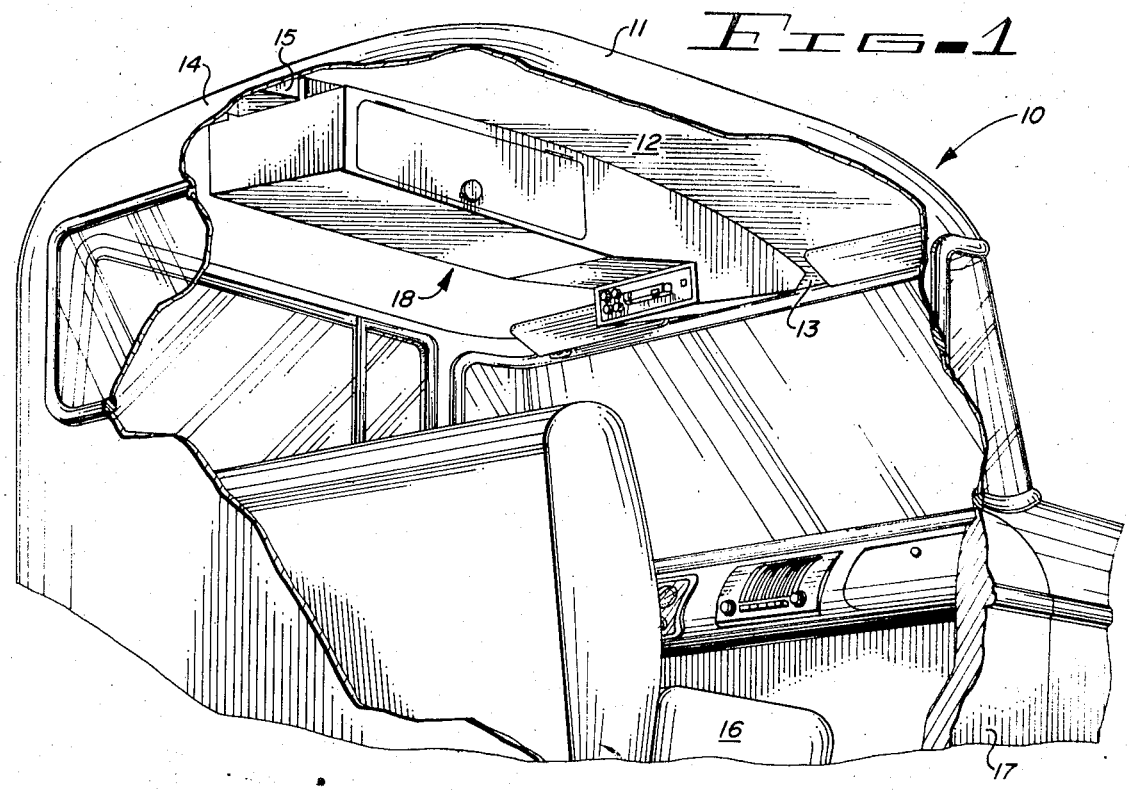
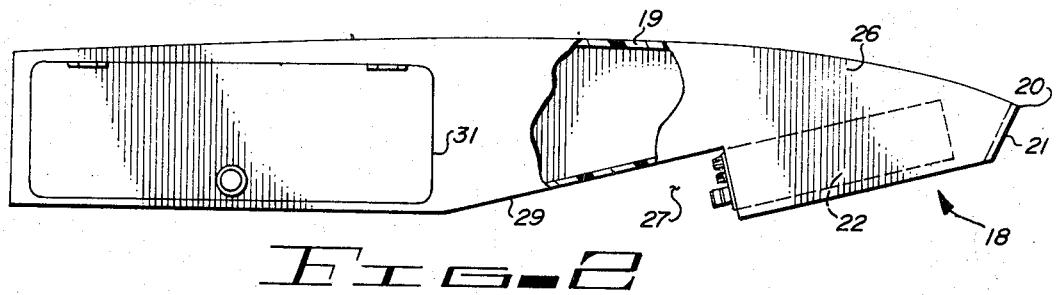
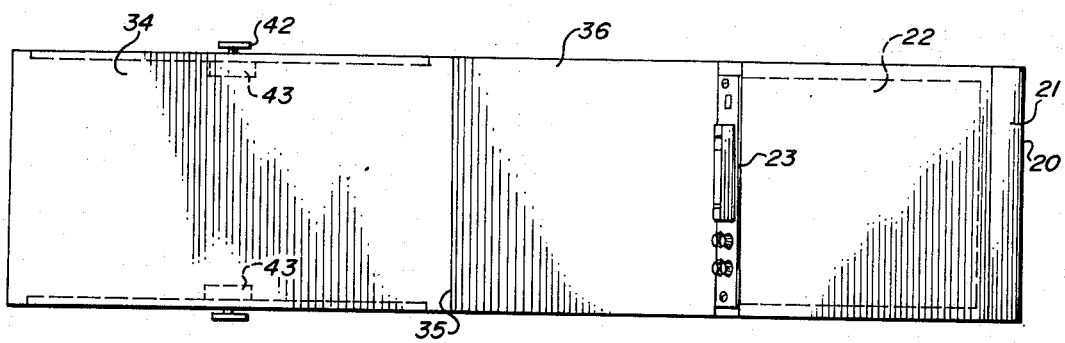

PATENTED NOV 20 1973 3,773,378
SHEET 2 OF 2
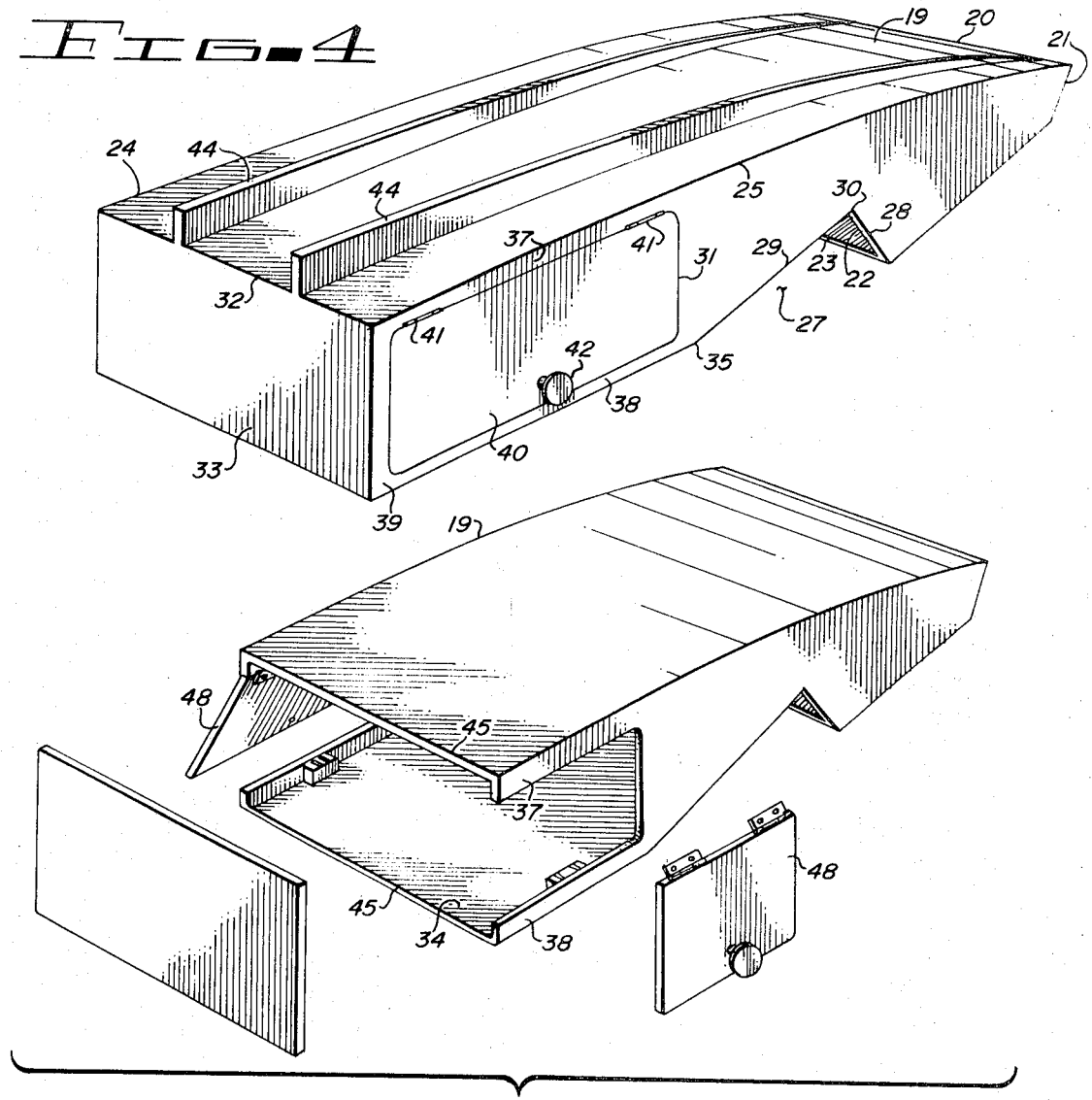
FIG-4
FIG-5
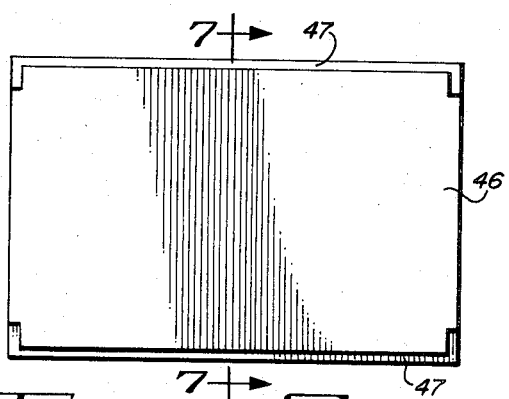
FIG-6
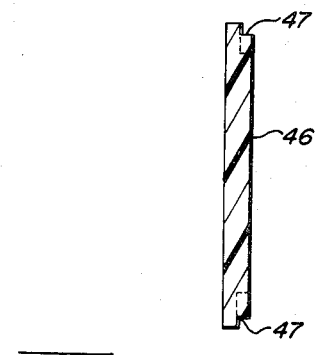
FIG-7

VEHICLE OVERHEAD CONSOLE

The present invention relates to vehicle consoles and is concerned primarily with an overhead console that is mounted in a vehicle cab midway the sides thereof.

BACKGROUND OF THE INVENTION

At the present time, vehicles have been provided with overhead racks or carriers for various purposes. Thus, overhead luggage racks are provided at each side of a bus. Carriers have been provided for various miscellaneous articles which are individually stored and an overhead storage device for facial tissues has been provided. Most of the devices of the character aforesaid have been provided in passenger vehicles of the type which is generally referred to as the "family automobile." There has also been provided an overhead rack for the cab of a pickup truck which is intended to receive a rifle or shotgun. This rack is characterized as extending transversely between the sides of the cab.

At the present time, trucks, pickups, campers and others of that class of vehicles which include cabs are now coming into widespread usage. The cabs of such trucks are not equipped or adapted to receive a tape player, radio or comparable device, which requires adjustment such as the selection of a station or replacement of a tape cartridge from time to time. Moreover, the cabs of such vehicles are not equipped with a storage compartment for small articles which is equally accessible to both the driver and a passenger at his side on the seat of the cab.

This invention is founded on the belief that a console that is mounted in a longitudinal position on the underside of the roof of a vehicle cab midway between the sides thereof and which presents a forward compartment having a rearwardly opening access area, and a rear compartment having a door-controlled access opening on each side, will find a high degree of utility and meet with appreciable public acceptance.

OBJECTS OF THE INVENTION

With the foregoing conditions in mind, the present invention has in view the following objectives:

1. To provide in a vehicle cab including a roof and a transverse seat extending between the sides of the cab, a console of elongate, rectangular shape that is mounted in a longitudinal position on the underside of the roof and centrally over the seat.

2. To provide an overhead vehicle console of the type noted which includes forward and rearward compartments, with the forward compartment having a rearwardly opening access area, and the rear compartment having an access opening at each side which is normally closed by a hingedly mounted door.

3. To provide an overhead vehicle console of the character aforesaid in which the forward compartment has an inclined bottom which cooperates with cut-outs in side walls of the console to define a rearwardly opening access area.

4. To provide an overhead console of the kind described which is of plastic.

5. To provide an overhead console of the type noted which includes a top wall that is curved to conform to the curvature which is ordinarily present in the underside of the roof of a vehicle cab and which top wall is provided with means for securing the console in position.

6. To provide an overhead vehicle console which is of a structural design which readily lends itself to fitting vehicle cabs of different longitudinal dimensions.

Various other more detailed objects and advantages of the invention such as arise in connection with carrying out the above ideas in a practical embodiment will, in part, become apparent and, in part, be hereafter stated as the description of the invention proceeds.

SUMMARY OF THE INVENTION

The foregoing objects are achieved by providing an overhead vehicle console which is made of plastic and which comprises a top wall of elongate, rectangular shape, of a curvature corresponding to the curvature which is present on the underside of the conventional roof of a vehicle cab, and a pair of upstanding spaced longitudinal ribs which are adapted to fit about a longitudinal reinforcing beam which is ordinarily present in the vehicle structure for the purpose of securing the console in position.

Depending from and extending rearwardly from the front edge of the roof is a narrow front wall, and extending downwardly and rearwardly from the lower edge of this front wall is a bottom wall which is disposed at a relatively small acute angle with respect to the horizontal. This bottom wall terminates in a free edge.

Depending from the side edges of the top wall are side walls having angular cut-outs or recesses. Each of these cut-outs presents a short and a long edge in angular relation. The free edge of the short edge of each cut-out terminates at the free edge of the aforesaid inclined bottom wall and cooperates therewith to provide a rearwardly opening access area for the forward compartment defined by the top wall, front, side walls and inclined bottom.

The side walls extend rearwardly to the ends of the long side edges of the cut-outs. A rearwardly extending inclined bottom wall section spans the space between these long side edges. This inclined bottom wall section is integrally joined to a horizontal bottom wall section which extends to the rear of the console where it is connected to the lower edge of a vertical rear wall which is connected at its upper edge to the rear edge of the top wall.

A flange depends from each side of the top wall between the rear wall and the end of a side wall. Another flange extends upwardly from each side of the rear bottom wall section. The flanges on each side, together with the edge of the side wall adjacent thereto and the rear wall, define an access opening which is normally closed by a door that is hingedly mounted on the upper flange and held in closed position by a detent on the bottom flange.

For a full and more complete understanding of the invention, reference may be had to the following description and the accompanying drawings wherein:

FIG. 1 is a perspective of a vehicle cab with parts of the side and roof construction broken away to permit illustration of the console of this invention which is mounted on the underside of the roof;

FIG. 2 is a view in side elevation of the console per se illustrating a tape player positioned in the forward compartment;

FIG. 3 is a bottom plan view of the console of FIGS. 1 and 2;

FIG. 4 is a perspective looking downwardly on the top of the console and illustrating the longitudinal ribs which are used in securing the console in position;

FIG. 5 is a perspective illustrating certain elements of the console in exploded relation when it is cut down to a smaller size to fit a particular cab;

FIG. 6 is a view in inside elevation of the rear end wall of FIG. 5, and

FIG. 7 is a detailed section taken on the line 7—7 of FIG. 6.

DESCRIPTION OF THE PREFERRED EMBODIMENT

Referring now to the drawings, wherein like reference characters denote corresponding elements throughout the several views, a vehicle cab is illustrated in FIG. 1 and is identified in its entirety by the reference character 10. It will be understood that the cab 10 is taken as typical of the cabs of that class of vehicles which includes trucks, pickups, campers and the like. The cab 10 will, of course, include many features which are not particularly pertinent to the present invention, thus only those structural elements which are relevant will be described. Cab 10 includes a roof 11 having an undersurface 12 having a curvature that is pronounced in the longitudinal dimension. Roof 11 terminates at a front edge 13 just over the windshield and at the rear in a depending curved flange 14. Extending along the underside of the roof 11 and depending from surface 12 is a reinforcing beam 15. Cab 10 also includes a front seat 16 which is intended to accommodate the driver at one side and a passenger on the other. This front seat extends between the sides 17 of the cab.

A console is identified generally at 18. While the console may be made of any of several materials, plastic is indicated as the preferred material because of the fact that it minimizes the cost of manufacturing the consoles. Console 18 comprises a top wall 19 having a curvature corresponding to the undersurface 12 of roof 11. Top wall 19 terminates in a front edge 20 and depending and extending rearwardly from front edge 20 is a narrow front wall 21. The walls 19 and 21 meet at edge 20 at an angle which enables the console to be fitted in cabs of various structural design. Extending rearwardly from the lower edge of front wall 21 is an inclined bottom 22. Bottom 22 is inclined at a relatively small acute angle with respect to the horizontal. Inclined bottom 22 terminates in a free edge 23. Top wall 19 presents side edges 24 and 25 and depending from each of these side edges is a substantially vertical side wall 26. Each side wall 26 is formed with a cut-out or recess 27 defined by a short edge 28 and a long edge 29. These edges 28 and 29 meet at an apex 30 and define substantially a right angle.

It will be noted that the forward portion of top wall 19, narrow front wall 21, inclined bottom 22 and the forward portions of side walls 26 define a forward compartment having a rearwardly opening access area defined by free edge 23 of bottom 22 and short edges 28 of recess 27. It is not intended that this access area be provided with a closure. As shown in FIGS. 2 and 3, a tape player may be easily inserted into this forward compartment or removed therefrom by either the driver or passenger while remaining seated, because of its central location. Obviously, any articles desired may be placed in this forward compartment, although the invention has particularly in mind the reception of such a device as a tape player, radio, or other instrument requiring frequent manipulation of operating members.

Side walls 26 are continued rearwardly where they terminate in end edges 31. Depending from rear edge 32 of top wall 19 is a rear wall 33. Extending forwardly of rear wall 33 is a rear bottom wall section 34. This bottom wall section 34 extends forwardly to the ends of long sides of cut-outs 27, which point is indicated at 35, where the substantially horizontal rear wall section 34 is integrally joined to an inclined rear wall section 36. Extending between rear wall 34 and the edge 31 of side wall 26 at each side is a depending flange 37 at the top and a upstanding flange 38 at the bottom. A vertical flange 39 also extends forwardly from each side edge of end wall 33.

Edge 31 and flanges 37, 38 and 39 define a laterally extending access opening at each side of the console for the rear storage compartment which is defined by the rear portion of top wall 19, rear portions of side walls 26, and wall 33 and bottom wall sections 34 and 36.

A closure for each of these last mentioned access openings is provided in the form of a door 40 which is pivotally mounted at its upper edge on flange 37 by hinges 41. Each door 40 is provided with an operating member in the form of a finger engageable knob 42, and a catch or detent, which is indicated diagrammatically at 43.

Upstanding from the outer surface of roof 19 and extending between the edges 20 and 32 thereof are a pair of spaced ribs 44. These ribs 44 are spaced apart a distance comparable to the width of beam 15 which is received therebetween in mounting the console 18 on the underside of roof 11. After the console has been positioned, with the beam 15 between ribs 44, screws or other fastening means may be used to secure the assembled relation.

OPERATION OF THE PREFERRED EMBODIMENT

While the manner of using the overhead vehicle console of this invention is believed to be obvious from the illustrations of the drawings and description of parts set forth above, it is noted that after the console 18 is secured in position on the underside of roof 11, access may be readily had to the forward compartment provided by inclined bottom 22. The angle of inclination is so small as to result in the friction created by an article resting on bottom 22 to hold it in position. Thus, there is no need for a closure for the access area to thiy compartment. This forward compartment is conveniently available to the driver or to the passenger.

The rear compartment provided by the space above the bottom wall sections 34 and 36 is conveniently available to either the driver or the passenger by opening the door 40 at the proper side.

THE MODIFICATION

It is recognized that there will be certain relatively small variations in the longitudinal dimensions of the cabs of different vehicle manufacturers. Thus, the cab of a Ford pickup truck is longer than the cab of a Chevrolet pickup truck. It is intended that vehicle consoles 18 by manufactured in a standard size of a length to accommodate the longer longitudinal dimension. However, it may be readily cut down to fit the cab of a shorter longitudinal dimension. Thus, referring to FIGS. 5, 6 and 7, top wall 19 and bottom wall section 34, together with flanges 37 and 38, are shown as cut off at end edges, all of which are designated 45. An end wall 46 which also is of plastic is formed with grooves 47 into which end edges 45 are fitted and the connections secured in any preferred manner, such as by an adhesive or fusing of the plastic. In the construction shown in FIG. 5, the rear compartment is shortened as are doors 48, and the access opening which they close.

While preferred specific embodiments are herein disclosed, it is to be clearly understood that the invention is not to be limited to the exact constructions, materials and dimensions illustrated and described, because various modifications of these details may be provided in putting the invention into practice.

What is claimed is:

1. For installation in a vehicle cab having a roof with an undersurface and a transverse seat, an overhead console of elongate, rectangular shape secured to the undersurface of the roof in a longitudinal position centrally above said seat, said console comprising:
   a. a top wall having a top surface conforming to the undersurface of the roof, a front edge, side edges, and a rear edge;
   b. means on said top wall for securing the console to the cab roof;
   c. a narrow front wall depending from the front edge of said top wall and having a bottom edge;
   d. a side wall depending from each of the side edges of the top wall and having a lower edge formed with a recess defined by a short edge and a long edge meeting at an apex, said lower edge including a rearwardly inclined portion between the bottom edge of said front wall and an end of said short edge;
   e. a rearwardly inclined bottom wall extending between the rearwardly inclined portions of said lower edges and rearwardly from the bottom edge of said front wall to the ends of said short edges, said front wall, top wall, inclined bottom wall, and the portions of said side walls between the rearwardly inclined portions of the lower edges of said side walls and corresponding portions of the side edges of said top wall defining a forward compartment having a rearwardly opening access area;
   f. a rear wall depnding from the rear edge of said top wall and having a lower edge;
   g. said side walls being continued rearwardly from said apices to said rear wall;
   h. an inclined bottom wall section between the long edges of said recesses;
   i. a horizontal rear bottom wall section extending from an end of said inclined bottom wall section to the lower edge of said rear wall, said bottom wall sections, rear wall, top wall and side walls cooperating to define a rear compartment;
   j. said rear compartment having a lateral access opening at each side, and
   k. a door hingedly mounted at its upper edge normally closing each of said lateral access openings.

2. The overhead vehicle console of claim 1 in which all of said walls are of plastic and integrally joined where they meet.

3. The overhead vehicle console of claim 1 in which said narrow front wall is rearwardly inclined and cooperates with said top wall to define an acute angle.

4. The overhead vehicle console of claim 1 in which the means for securing the console to the cab roof comprises a pair of spaced ribs upstanding from said top wall and disposed longitudinally thereof.

5. The overhead vehicle console of claim 1 in which each of said lateral access openings is defined by an edge of a side wall, a flange depending from a side edge of said top wall, a flange upstanding from a side edge of said horizontal rear bottom wall section and an edge of said rear wall, with each of said doors being hingedly mounted on one of said depending flanges.

6. The overhead vehicle console of claim 5 in which the rear wall is formed with inwardly opening grooves that receive end edge portions of said top wall, the flanges depending therefrom, the horizontal rear bottom wall section and the flanges upstanding therefrom together with means for securing said rear wall to said end edge portions.

7. The overhead vehicle console of claim 5 together with cooperating elements of a detent on the lower edge of each door and the upstanding flange therebelow.

8. The overhead vehicle console of claim 7 together with an operating knob on each of said doors.

* * * * *